Nov. 29, 1955  A. G. BODINE, JR  2,725,264
BEARING FOR SUCKER RODS AND THE LIKE
Filed Feb. 3, 1951  2 Sheets-Sheet 1
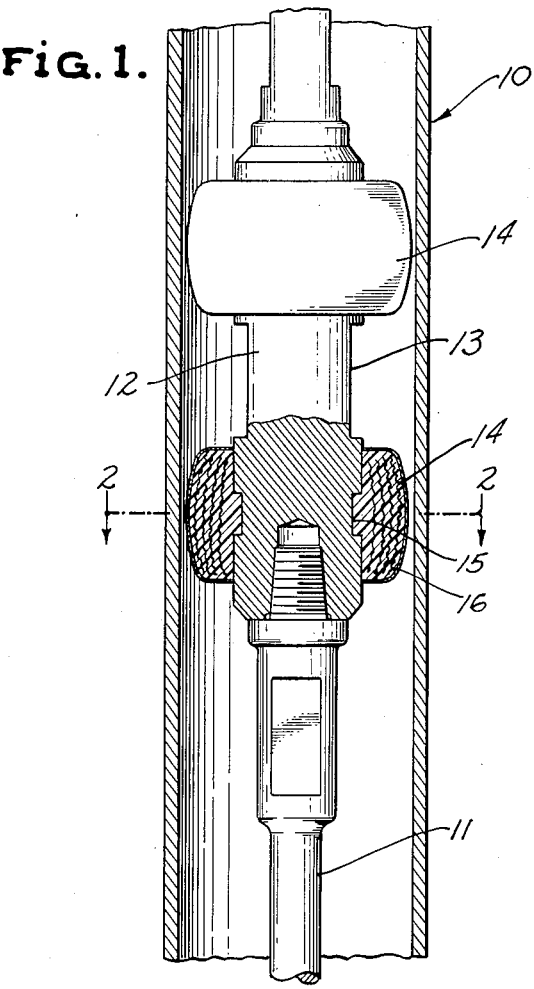
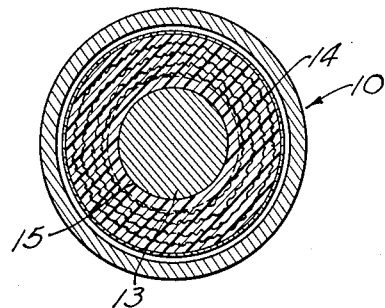
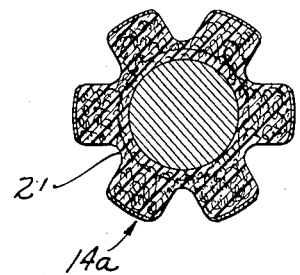
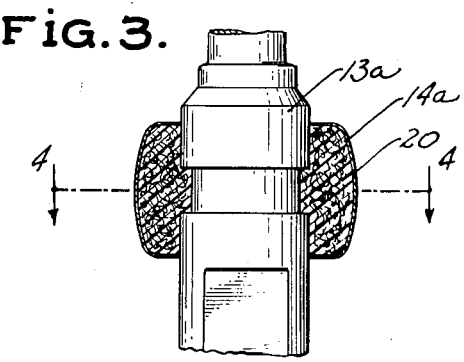
ALBERT G. BODINE JR.
INVENTOR.
BY
ATTORNEY.

Nov. 29, 1955 — A. G. BODINE, JR — 2,725,264
BEARING FOR SUCKER RODS AND THE LIKE
Filed Feb. 3, 1951 — 2 Sheets-Sheet 2

ALBERT G. BODINE JR.
INVENTOR.

BY *[signature]*

ATTORNEY.

United States Patent Office 2,725,264
Patented Nov. 29, 1955

2,725,264

BEARING FOR SUCKER RODS AND THE LIKE

Albert G. Bodine, Jr., Van Nuys, Calif.

Application February 3, 1951, Serial No. 209,268

1 Claim. (Cl. 308—4)

This invention relates generally to deep well oil pumping apparatus, and more particularly to pump tubing and to problems incident to wear of pump tubing during normal pumping operations.

One of the most serious operating problems in conventional deep well pumping is concerned with tubing deterioration owing to the reciprocating sucker rod string therein. I have found that this deterioration is not only a matter of simple wear as a result of rubbing of the sucker rod string on the tubing, but is a function of corrosion by the earthen fluids pumped through the tubing. Apparently the earthen fluids build up a coating of corrosion on the pipe until this coating becomes a sort of inhibitor of further corrosion. The sucker rods, however, rub away this corrosive coating at particular localized regions inside the tubing, constantly exposing virgin pipe metal to the corrosive action of the earthen fluids pumped therethrough.

The general object of the invention is accordingly the provision of means for protecting the pump tubing from the destructive actions described in the foregoing.

The present invention provides the sucker rod string with one or more fiber filled resinoid bearing members, composed typically of a molded fiber filled phenolic resin, and these bearing members which are designed to rub against the tubing, or the sucker rods, or both, are insufficiently hard and abrasive to wear away the corrosive coating and expose the virgin metal to the corrosive influence of the well fluids. On the contrary, the resinous substance smears or rubs off on the metal, and forms a protective coating thereon. I am not entirely certain of the nature of the action that takes place, but I have observed a definite "glazing" of a corroded metal surface by such a plastic bearing. The plastic evidently smears or rubs off onto the metal surface, is scrubbed thereagainst by the petroleum soaked scrubber formed by the fibrous filler, and forms a glazed, non-corrosive paint or protective coating over the surface of the metal. This glazed coating is probably a joint product of the corrosive substance and the plastic material in intimate combination, produced by repeated rubbing of the bearing against the corroded metal. The action apparently takes place best, or probably only, when the bearing is lubricated, and the well fluid serves this purpose. The fibrous filler soaks up the petroleum well fluids and maintains a petroleum fluid film between the bearing body and the surface being scrubbed. The petroleum may enter into the glaze composition. After this glaze has been built up, the tubing and bearing are conditioned to last indefinitely, with almost no measurable wear. An additional phenomena which I have observed in the operation of this bearing indicates that abrasive pipe scale in the bearing gap becomes finally embedded out of harms way into the plastic; and, during the process of being so buried, these abrasive particles help polish the metal surface so that a smooth polished glaze can more readily be formed.

The invention will be best understood from the following detailed description of certain present illustrative embodiments thereof, reference being made to the accompanying drawings, in which:

Figure 1 is a longitudinal sectional view through a portion of pump tubing showing a sucker rod coupling joint therein equipped with bearing devices in accordance with the invention;

Figure 2 is a transverse section taken on line 2—2 of Figure 1;

Figure 3 is a fragmentary view showing a modification of Figure 1;

Figure 4 is a transverse section taken on line 4—4 of Figure 3;

Figure 5:
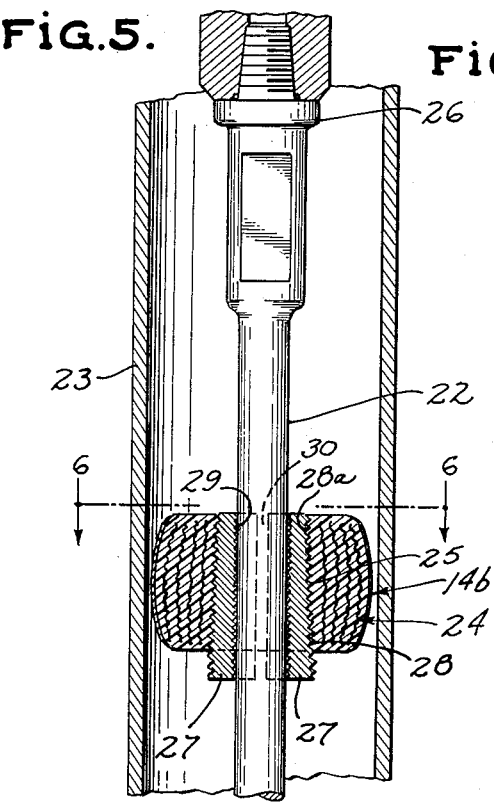
Figure 5 is a longitudinal sectional view of a section of pump tubing showing a sucker rod therein equipped with an alternative bearing in accordance with the invention.

In the drawings, numeral 10 designates generally a section of a usual pump tubing, and numeral 11 designates generally a portion of a sucker rod string working in said tubing. This sucker rod string is shown to have a usual double box coupling 12, receiving the pins of the two sucker rods coupled thereby. The coupling 12 has mounted therein, at opposite ends thereof, and on opposite sides of the conventional wrench flats 13, a pair of my plastic bearings 14. The plastic bearing in its present preferred form is composed of a molded fiber filled phenolic resin body bonded to or interlocked with the coupling. For example, and as shown in Figure 1, the coupling body may be peripherally grooved, as at 15, and the phenolic resin body 14 is molded to key into this groove as clearly indicated in Figure 1. The phenolic resin body 14 is filled with a fibrous filler material, in this instance cotton canvas 16 wrapped around the coupling. In the embodiment of Figure 1, these bearings are annular in transverse section (see Figure 2), and their peripheries are crowned or convex as seen in longitudinal vertical section, so as to present a convex bearing surface to the exterior wall surface of the pump tubing. Preferably, the bearing has an axial dimension sufficient that it will not drop into the notch at a tubing joint, and for this purpose it should be more than 2" in length. When the bearings are used in pairs, as in Figure 1, this feature is not of prime importance, though it becomes of importance wherever a single bearing is employed. As shown in Figure 1, the diameter of the plastic bearing is somewhat less than that of the tubing, so as to leave an adequate fluid passage therepast. In a typical oil well installation, a difference of the order of ¼" between the exterior diameter of the bearing and the internal diameter of the tubing is typical.

The bearing can be improved by providing its exterior with a coating consisting of phenolic varnish mixed with graphite, molybdenum sulphide, or other coating capable of smearing off on the inside surface of the tubing. This added coating quickly smears onto the surface of the tubing, and thus hastens obtainment of the glazing effect to some extent, but is not found essential.

In operation, the well fluids are of course in contact with the exterior surfaces of the bearings 14. The rubbing action of the crowned surfaces of the bearings on the interior surfaces of the tubing, particularly where corrosion has taken place, results in the resinous substance of the bearing and/or its coating rubbing off or smearing onto the interior surface of the tubing. The fibrous filler acts as a wick to soak up petroleum fluids, and supplies a film of such fluid between the surface of the pipe and the rubbing surface of the bearing. In addition, the fibrous filler acts as a scrubber, to scrub the resinous substance into and along the corroded surface of the pipe. The ultimate result is that a hard, polished glaze forms on the interior of the tubing. The virgin metal of the tubing is therefore not exposed to further corrosive action by the well fluids, and the hard glaze formed inside the tubing exhibits almost no wear even after long service.

The alternative embodiment shown in Figures 3 and 4 consists of a phenolic resin body 14a mounted on sucker rod coupling 13a, with the body 14a in this instance containing, in place of the canvas wrapping of Figure 1, random cotton fibers such as indicated by numeral 20. The bearing 14a of Figures 3 and 4 is fluted, rather than full circular, as indicated at 21 in Figure 4, and this fluted configuration forms additional passage space for the upwardly traveling well fluid.

Figure 6:
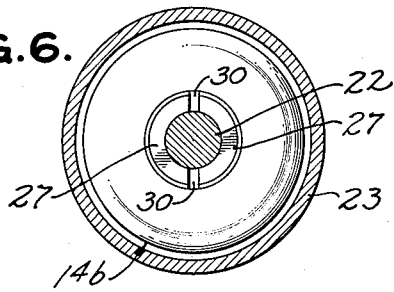
Figure 6 is a transverse section taken on line 6—6 of Figure 5.

In Figure 5 I have illustrated an alternative embodiment in which my glazeable plastic bearing, in this instance designated by numeral 14b, is mounted directly on a sucker rod 22, the pump tubing being designated by numeral 23. In this instance the plastic bearing 14b, again preferably or typically composed of a molded phenolic resin, canvas filled as indicated at 24, has an axial tapered hole 25, of sufficient diameter to permit being installed over the upset end 26 of the sucker rod, and inserts in the form of wedge slips 27 are installed inside the tapered hole 25 to mount the bearing tightly on the sucker rod. Assuming the wedge slips 27 to be formed of steel, they may be externally screwthreaded, as indicated at 28, in order to make screwthreaded engagement with complementary screwthreads 28a formed inside the hole 25 in the plastic bearing, and they may be serrated on their inner concave surfaces, as indicated at 29, in order to bite into and grip the sucker rod. To assure biting engagement of the slips with the sucker rod 22, the two slips are formed to have gaps 30 between their confronting edges when installed on the sucker rod, as clearly shown in Figure 6.

Figure 8:
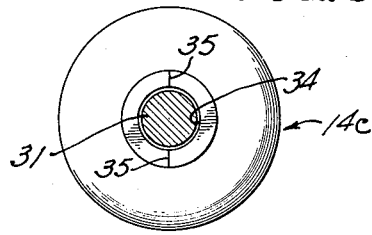
Figure 8 is a view taken in accordance with line 8—8 of Figure 7.
Figure 7:
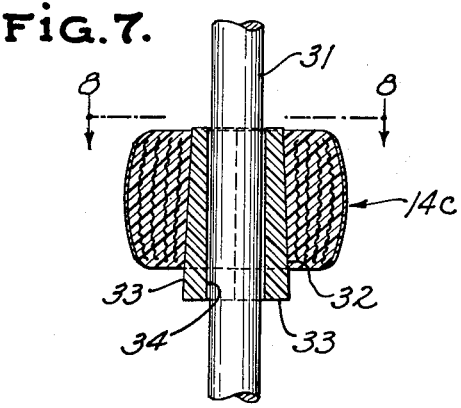
Figure 7 is a fragmentary view similar to Figure 5, but showing an alternative form of bearing.

Figures 7 and 8 show a further embodiment, wherein the plastic bearing 14c is again mounted on a sucker rod, here indicated at 31, but arranged to slide on the sucker rod, and the bearing includes a plastic insert which rubs on the sucker rod, so that in this instance the bearing rubs partly on the surrounding pump tubing (omitted from Figure 7) and partly on the sucker rod. In the typical structure shown in Figures 7 and 8, the bearing body 14c has an axial tapered hole 32, which receives plastic wedge slip inserts 33, the latter being driven inside the body 14c to provide a friction fit therein. When so driven into position, the longitudinal edges of the wedge slips engage one another, as indicated at 35 (Figure 8), and the hole 34 defined by the wedge slips is of slightly larger diameter than the sucker rod, so as to permit the bearing to slide along the sucker rod. The wedge slips 33 are composed of the same glazeable plastic material as the body part 14c, typically a phenolic resin, and the concave inner surfaces of the wedge slips 33 accordingly, in the event of sliding on the sucker rod 31, will rub off or smear on the surfaces of the latter and afford the same type of glazed protective coating on the sucker rod that has previously been described as formed on the interior surfaces of the tubing.

Thus, in the form of Figure 7, the plastic bearings are movable both with relation to the pump tubing, and with relation to the sucker rod. What rubbing occurs will accordingly be divided between the pump tubing and the sucker rod. The rubbing at each location will result in the action heretofore described, namely, a rubbing off or smearing of a very small amount of the material of the bearing (outside bearing body, or inserted slips), onto the adjacent metal of the tubing, or the sucker rod, with the result of coating and glazing the metal, and thereby protecting the metal against continued corrosive action by the well fluids as well as from frictional wear.

Figure 10:
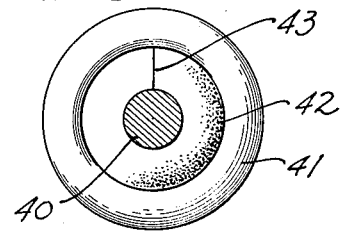
Figure 10 is a view taken in accordance with line 10—10 of Figure 9.
Figure 9:
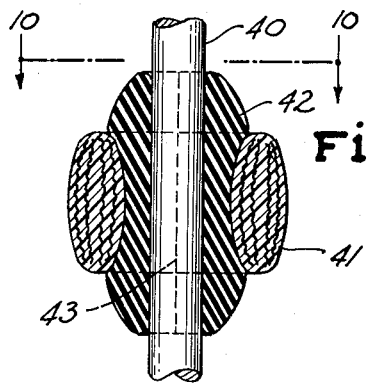
Figure 9 is a view similar to Figure 7, but showing another modification.

Figures 9 and 10 show still another embodiment of the invention, the sucker rod 40 in this instance being surrounded by a plastic fiber filled annulus 41, whose exterior surface is crowned in the usual way. The annular space between the bearing 41 and the sucker rod is filled by a synthetic rubber spool 42, the latter being longitudinally split, as indicated at 43, in order to be readily mounted on the sucker rod. The annular plastic bearing 41 is pressed on over the spool 42, and compresses the rubber tightly against the sucker rod so that the bearing is securely gripped to the latter. The rubber spool affords added shock resistance, and is further beneficial from that standpoint; however, I have found that the preferred fabric filled phenolic resin has especially good shock and vibration resisting properties, and this added shock protection, while helpful, is not essential.

Referring again to the embodiment of Figure 1, it should further be understood that a plastic bearing of the general nature there disclosed can consist of simply a plastic annular body, which can be simply slipped on over the rod coupling at the well, after the coupling has been cleaned and the ring and coupling painted with a bonding varnish. By providing a relatively tight frictional and bonded fit between the plastic body and the coupling, the bearing will be sufficiently tightly mounted, even though the keyed configuration illustrated in Figure 1 be omitted. It will be understood that this variation of the invention will facilitate application of the bearing to present sucker rod couplings without the necessity of structural change in the coupling.

It is evident that, while I have found a molded phenolic resin to be a suitable plastic, any alternative "smearing" plastic which will form the desired glazed coating over the corroded metal may be substituted. The invention accordingly requires and makes use of a smearable, glazing plastic, and any found suitable may be used. Also, the bearing of the present invention may be employed in other situations where two metal members, one within the other, may rub on one another in the presence of corrosive well fluids. The invention is accordingly particularly applicable to sucker rod bearings, but, in its broader aspects, not necessarily restricted thereto.

The invention has now been disclosed in several illustrative forms. It is of course to be understood that these are merely typical of various forms which the invention may take in practice, and that various additional changes in design, structure and arrangement may be made without departing from the spirit and scope of the invention, as defined by the appended claim.

I claim:

For use with a sucker rod string in a pump tubing, a bearing member for mounting on a string of sucker rods having upset ends, said bearing comprising a body having an axial opening therethrough dimensioned to receive and pass the upset end on a sucker rod, an insert receivable in said axial opening in said body, said insert having an axial bore therethrough of larger diameter than the diameter of said rod, thereby affording a running clearance with said sucker rod, said body having a peripheral bearing surface adapted to face and rub against the inside surface of said tubing, and said body and said insert comprising a smearing plastic substance.

References Cited in the file of this patent

UNITED STATES PATENTS

| | | |
|---|---|---|
| 1,730,158 | Merrick | Oct. 1, 1929 |
| 1,929,836 | Brown | Oct. 10, 1933 |
| 1,960,364 | Bailey | May 29, 1934 |
| 1,980,081 | Ovington | Nov. 6, 1934 |
| 2,153,787 | Anderson | Apr. 11, 1939 |
| 2,352,412 | Sandstone | June 27, 1944 |
| 2,368,415 | Grant | Jan. 30, 1945 |